United States Patent [19]

Tahara

[11] Patent Number: 5,744,219
[45] Date of Patent: Apr. 28, 1998

[54] TRANSFER FOIL HAVING REFLECTING LAYER WITH SURFACE RELIEF PATTERN RECORDED THEREON

[75] Inventor: Shigehiko Tahara, Tokyo, Japan

[73] Assignee: Dai Nippon Printing Co., Ltd., Tokyo, Japan

[21] Appl. No.: 368,595

[22] Filed: Jan. 4, 1995

Related U.S. Application Data

[63] Continuation-in-part of Ser. No. 352,423, Dec. 8, 1994, abandoned, which is a continuation of Ser. No. 84,506, Jun. 29, 1993, abandoned, which is a continuation of Ser. No. 826,063, Jan. 24, 1992, Pat. No. 5,300,169.

[30] Foreign Application Priority Data

| Jan. 28, 1991 | [JP] | Japan | 3-8384 |
| Feb. 1, 1991 | [JP] | Japan | 3-12183 |
| Mar. 11, 1991 | [JP] | Japan | 3-43932 |

[51] Int. Cl.$^6$ .................................................. B32B 3/00
[52] U.S. Cl. .................. 428/195; 428/421; 428/200; 428/203; 428/212; 428/411.1; 428/457; 428/488.4; 428/914
[58] Field of Search .......................... 428/200, 202, 428/204, 411.1, 913, 914, 42.1, 195, 203, 212, 457, 488.4; 427/147, 148; 156/233

[56] References Cited

U.S. PATENT DOCUMENTS

| 4,012,552 | 3/1977 | Watts | 156/233 X |
| 4,366,223 | 12/1982 | Larson | 156/240 X |
| 4,419,436 | 12/1983 | Kranser | 156/239 X |
| 4,657,803 | 4/1987 | Pernicano | 156/230 X |
| 4,728,377 | 3/1988 | Gallagher | 156/233 X |
| 4,892,602 | 1/1990 | Oike et al. | 156/233 |

*Primary Examiner*—William Krynski
*Attorney, Agent, or Firm*—Dellett and Walters

[57] ABSTRACT

A method wherein a hologram is transferred from a transfer foil formed with a surface relief pattern and having a reflecting layer, and information, e.g., an image or a character, other than information originally recorded on the hologram is added to the transferred hologram. The method comprises preparing a transfer foil having a reflection relief hologram comprising a resin layer having a surface relief pattern, e.g., a relief hologram, a relief diffraction grating, etc., formed on the surface thereof, and a reflecting layer formed on the relief surface of the resin layer, transferring at least a part of the hologram to the surface of an object, and heating a part of the transferred portion with a heating device, thereby destroying the reflecting layer to record another information. Also disclosed are a method which enables a fine hologram pattern to be readily transferred to a large area, a transfer foil having a reflecting layer which enables a surface relief pattern to be transferred precisely with excellent foil breaking characteristics, and a method of producing a surface relief pattern transfer foil.

17 Claims, 6 Drawing Sheets

TRANSFER FOIL HAVING REFLECTING LAYER WITH SURFACE RELIEF PATTERN RECORDED THEREON

This application is a continuation-in-part of application Ser. No. 08/352,423, filed Dec. 8, 1994, now abandoned which is a continuation of application Ser. No. 08/084,506 filed Jun. 29, 1993, now abandoned which is a continuation of application Ser. No. 07/826,063 filed Jan. 24, 1992, now U.S. Pat. No. 5,300,169.

BACKGROUND OF THE INVENTION

The present invention relates to a transfer foil having on the surface thereof a surface relief pattern, for example, a hologram, a building material, an optical recording medium, etc., which can be transferred in a precise pattern by a hot stamper, a thermal head or the like. The invention also relates to a method of producing such a transfer foil.

Holograms, in which information is recorded generally in the form of interference patterns of light, are used in various fields as high-density information recording media for recording and displaying two- and three-dimensional images and other information. Among them, relief holograms are formed in such a manner that a holographic interference fringe pattern is recorded in the form of a relief pattern on a photoresist, for example, and the relief pattern is transferred by plating, for example, to form a stamper, which is then stamped on a transparent thermoplastic resin material with or without a reflecting layer of a metal or the like formed on the surface thereof, thereby making a large number of duplicates. Relief holograms wherein a reflecting layer, e.g., a metal layer or a high refractive index layer, is provided on the relief surface and an image is reconstructed by light reflected and diffracted by the reflecting layer include two different types, in one of which the incident light is reflected almost completely by the reflecting layer, while in the other part of the incident light is reflected to reconstruct a hologram image on a background of transmitted light. In this application, these two types are included in the reflection relief holograms. In addition, another type of relief hologram in which the relief pattern comprises phase diffraction grating patterns properly arranged is also considered to be included in the reflection relief holograms.

Figure 7:
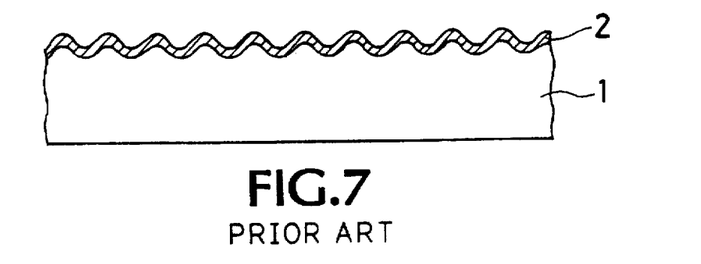
FIG. 7 shows a sectional structure of a typical reflection relief hologram.

A typical reflection relief hologram has a sectional structure as shown in FIG. 7, and it comprises a hologram layer 1 of a thermoplastic resin material or the like and a reflecting layer 2 formed on a relief interference fringe surface (i.e., relief surface) defined by the surface of the hologram layer 1. The reflecting layer 2 comprises either a deposited metal film, e.g., aluminum or tin, or a high refractive index transparent film, e.g., zinc sulfide. With a deposited metal film, a reflection relief hologram that reflects the incident light substantially completely by the metal is formed. With a high refractive index transparent film, the resulting reflection relief hologram is of the type in which part of the incident light is reflected to reconstruct a hologram image on a background of transmitted light because of Fresnel reflection based on the refractive index difference between the hologram layer 1 and the reflecting layer 2. Such a reflection relief hologram may be produced by either of the following two methods: one in which holographic information is recorded in the form of a relief pattern on a photoresist, for example, and the relief pattern is transferred by plating, for example, to form a stamper, which is then stamped on a transparent thermoplastic resin material that constitutes a hologram layer 1 to duplicate the relief pattern, and a reflecting layer 2 is formed on the duplicated pattern by deposition or the like; and the other in which a reflecting layer 2 is previously formed on a transparent resin layer that forms a hologram layer 1, and a stamper formed with the above-described relief pattern is hot-stamped on the reflecting layer 2 to duplicate the relief pattern (for example, see Japanese Patent Application Laid-Open (KOKAI) No. 58-65466 (1983)).

Figure 8:
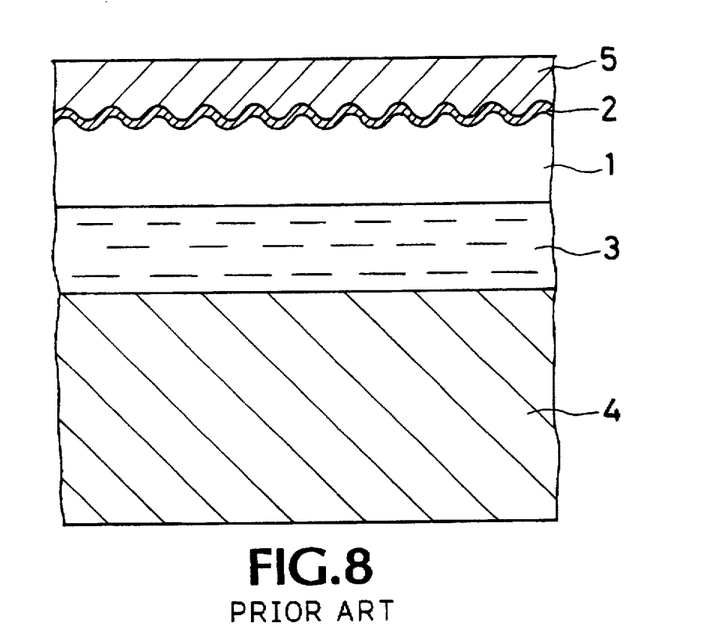
FIG. 8 shows a sectional structure of the reflection relief hologram shown in FIG. 7, which is arranged in the form of a transfer foil.

Incidentally, such a reflection relief hologram can be arranged in the form of a transfer foil (for example, see Japanese Patent Application Laid-Open (KOKAI) No. 01-283583 (1989)). FIG. 8 shows a section of the transfer foil. In order to enable the reflection relief hologram shown in FIG. 7 to be transferable, a base film 4 of PET (polyethylene terephthalate) or the like is provided on the side of the hologram layer 1 opposite to the side thereof where the reflecting layer 2 is provided, through a release layer 3 of wax or the like, and a heat-sensitive adhesive layer 5 of a vinyl chloride resin or the like is provided on the reflecting layer 2. The hologram 1 and the reflecting layer 2 in a desired profile region of a transfer foil having the above-described arrangement may be transferred to a substrate of vinyl chloride, for example, by using, for example, a thermal recording head or a hot stamper, as follows: The transfer foil is set in between a substrate 6 to which the hologram is to be transferred and a thermal recording head or hot stamper 7 such that the heat-sensitive adhesive layer 5 faces the substrate 6, while the base film 4 faces the thermal recording head or hot stamper 7, and in this state the thermal recording head 7 is driven or the hot stamper 7 is pressed under heating.

Figure 9:
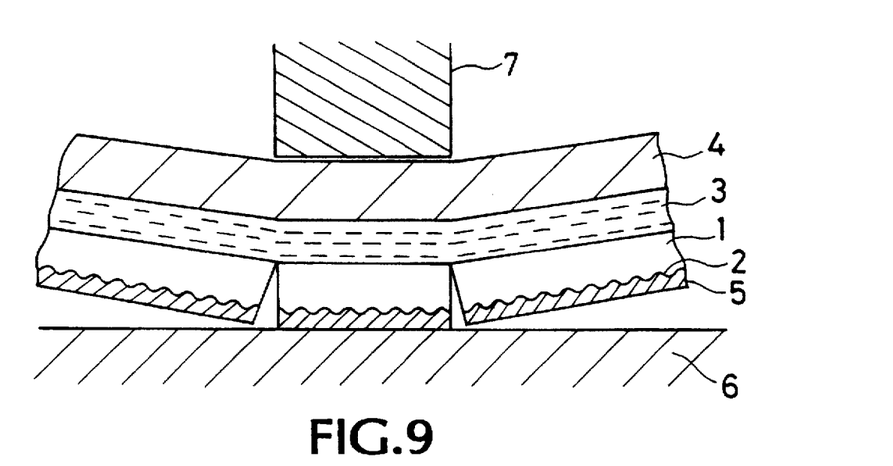
FIG. 9 illustrates the way in which the transfer foil shown in FIG. 8 is transferred by using a thermal recording head.

Thus, the reflection relief hologram has heretofore been transferred to the substrate 6, e.g., a card, as shown in FIG. 9 to display visible information, e.g., a mark, an image, etc., on a card or the like. However, it has been impossible to record and display in the transfer region image information, character information, etc., other than the information originally recorded on the transfer foil.

Further, in either the transfer method employing a hot stamper or the transfer method employing a thermal recording head, only the transfer hologram pattern portion is heated from the side of the base film which is remote from the hologram layer, a heat or pressure dispersion phenomenon occurs in the base film, so that it is difficult to reproduce the desired pattern strictly. Thus, the prior art is unsuitable for transfer of a fine pattern.

Incidentally, there has heretofore been a known method of duplicating a large number of transfer foils having a surface relief pattern, for example, a relief hologram, a diffraction grating, an optical information recording medium, etc., as described above. According to this method, a resin layer that is provided on a base film through a release layer is softened by heat-pressing to form a relief pattern, thereby duplicating a large number of transfer foils by embossing.

It is common for most of these relief pattern transfer foils to form a reflecting layer of a metal or the like by plating technique on a relief pattern formed on a resin layer in order to enhance the optical effectiveness of the relief pattern.

However, the method, in which a metal thin film layer is provided on a relief pattern formed on a resin layer, involves the problem that during the formation of a relief pattern on the resin layer, the material of the resin layer may be transferred to a relief forming stamper due to the release resistance occurring between the stamper and the resin layer. If silicone or the like is added to the resin layer to reduce the release resistance of the transfer foil in order to prevent the described problem, the adhesion with a reflecting layer formed subsequently lowers, so that the reflecting layer becomes likely to separate. If the film breaking strength of the resin layer is increased, the release characteristics and foil breaking characteristics required for the transfer process deteriorate, so that it becomes difficult to transfer a fine pattern.

When the relief pattern is formed on a resin layer of a thermoplastic resin material under heating, there is a need for a process of releasing the resin layer from the stamper after cooling it because it is likely that the relief pattern formed will be deformed by the heating remaining after the release.

In addition, when a metal thin film layer is formed on a relief pattern, the relief pattern may be deformed by heat or chemical influence during plating process, or it may be impossible to obtain a reflecting layer with a uniform thickness distribution due to the relief pattern. It is also likely that mixing of dust will cause a pinhole or adhesion failure. Thus, the prior art suffers from problems in terms of quality.

In addition, when the take-up type semi-continuous deposition method or the like is employed for the formation of a reflecting layer, the process efficiency is inferior in that a reflecting layer is deposited each time the embossing process has been completed, so that it is disadvantageous to small lot products in terms of both cost and time.

SUMMARY OF THE INVENTION

In view of the above-described circumstances, it is an object of the present invention to provide a surface relief pattern transfer foil having a reflecting layer which enables a surface relief pattern to be transferred precisely with excellent foil breaking characteristics by a hot stamper, a thermal head or the like, and also provide a method of producing such transfer foils, particularly reflection relief holograms, that is, a method of emboss-duplicating a transfer foil having a surface relief pattern faithful to the original plate with excellent release characteristics and superior foil breaking characteristics by press-embossing a surface relief pattern on a substrate through a reflecting layer which has been formed thereon in advance.

To attain the object, the present invention provides a surface relief pattern transfer foil comprising a releasable base film, a resin layer, a reflecting-layer, and a heat-sensitive adhesive layer, which are stacked in the mentioned order, and having a surface relief pattern formed on the surface of the resin layer on the side thereof where the reflecting layer is provided, wherein the peel strength between the releasable base film and the resin layer is 1 g/inch to 5 g/inch, and the peel strength is larger than the film breaking strength of the resin layer.

Preferably, the initial bond strength of the heat-sensitive adhesive layer is larger than the peel strength between the releasable base film and the resin layer, and the welding temperature of the heat-sensitive adhesive layer is lower than the glass transition temperature of the resin layer. More preferably, the thickness of the transfer foil is not larger than 15 μm. If the surface relief pattern is formed as an interference fringe relief pattern, a reflection relief hologram transfer foil is obtained.

The invention also provides a method of producing a transfer foil comprising a releasable base film, a resin layer, a reflecting layer, and a heat-sensitive adhesive layer, which are stacked in the mentioned order, and having a surface relief pattern formed on the surface of the resin layer on the side thereof where the reflecting layer is provided, the method comprising the steps of: preparing a laminate comprising a releasable base film, a resin layer and a reflecting layer, which are stacked in the mentioned order; and press-embossing a surface relief of a stamper having a surface relief pattern recorded thereon on the reflecting layer side of the laminate at high temperature and high pressure, thereby transferring the surface relief pattern to both the reflecting layer and the resin layer.

Preferably, the press embossing is carried out by using a resin layer material that satisfies the following condition:

$$T_g \leq T_s \ll T_e$$

where $T_g$ is the glass transition temperature of the resin layer, $T_s$ the softening temperature of the resin layer, and $T_e$ the press embossing temperature.

Preferably, the press embossing is carried out with a metallic stamper, and the press pressure in the case of a roll press is 10 kg/cm² to 200 kg/cm² in terms of linear pressure, while in the case of a flat press the pressure is 50 kg/cm² to 1,000 kg/cm². It is also preferable that the press embossing should be carried out with a stamper having a hardness of Hv 200 to Hv 600 in terms of Vickers hardness.

According to the surface relief pattern transfer foil having a reflecting layer of the present invention, the peel strength between the releasable base film and the resin layer is 1 g/inch to 5 g/inch and set to be larger than the film breaking strength of the resin layer. Therefore, a surface relief pattern can be thermally transferred precisely even with weak adhesive force, with excellent foil breaking characteristics and without chipping or tailing.

According to the method of producing a transfer foil of the present invention, a laminate comprising a releasable base film, a resin layer, and a reflecting layer, which are stacked in the mentioned order, is prepared, and a surface relief of a stamper having a surface relief pattern recorded thereon is press-embossed on the reflecting layer side of the laminate at high temperature and high pressure, thereby transferring the surface relief pattern to both the reflecting layer and the resin layer. Accordingly, the surface relief pattern can be duplicated faithfully without being deformed again and without the need for a deposition process, a cooling process, etc. In addition, it is possible to readily produce a transfer foil which enables a surface relief pattern to be thermally transferred precisely with excellent release characteristics and superior foil breaking characteristics.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the present invention of this application will be described below with reference to the accompanying drawings.

The following is a description of the surface relief pattern transfer foil having a reflecting layer according to the present invention.

Figure 1:
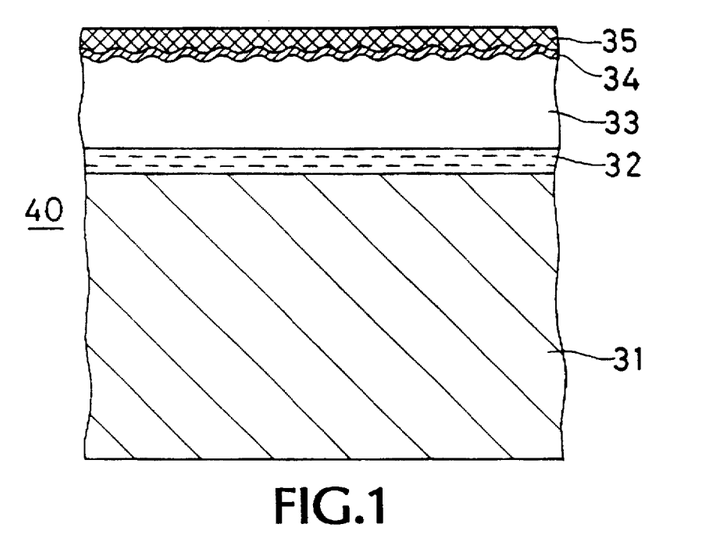
FIG. 1 is a sectional view of the transfer foil according to the present invention, which is arranged in the form of a reflection relief hologram.

FIG. 1 shows a section of the transfer foil of the present invention which is arranged in the form of a reflection relief hologram. The transfer foil 40 comprises a base film 31, a release layer 32 provided therein, a resin layer 33 formed on the release layer 32 from a thermoplastic resin or the like, a reflecting layer 34 formed on a surface relief pattern (in this case, an interference fringe relief surface) defined by the surface of the resin layer 33, and a heat-sensitive adhesive layer 35 coated on the exposed surface of the reflecting layer 34. Physical properties, materials, thickness, etc., of these layers will be described later. It should be noted that the reflecting layer 34 comprises either a deposited metal film, e.g., aluminum or tin, or a high refractive index transparent film, e.g., zinc sulfide. With a deposited metal film, a reflection relief hologram that reflects the incident light substantially completely by the metal is formed. With a high refractive index transparent film, the resulting reflection relief hologram is of the type in which part of the incident light is reflected to reconstruct a hologram image on a background of transmitted light because of Fresnel reflection based on the refractive index difference between the resin layer 33 and the reflecting layer 34.

Let us examine conditions under which the surface relief pattern transfer foil 40 having the reflecting layer 34 can transfer a fine pattern with high accuracy and high resolution by a hot stamper or thermal head 37.

Figure 2:
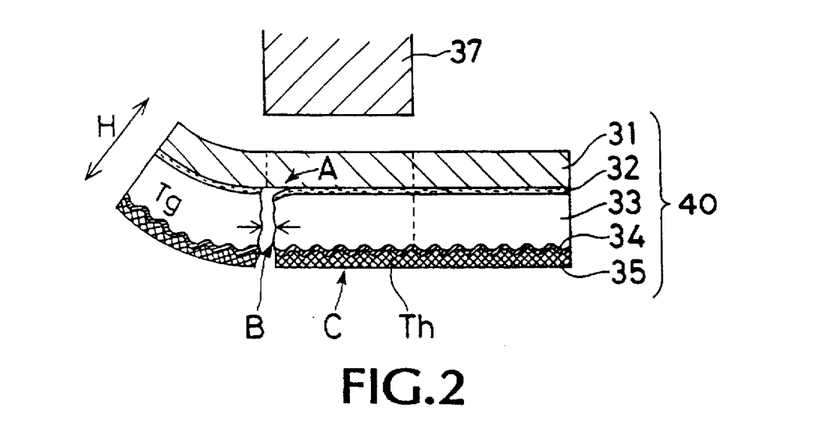
FIG. 2 shows schematically parameters of various portions of the transfer foil shown in FIG. 1.

First, parameters are defined. As shown schematically in FIG. 2, the peel strength of the release layer 32 is defined as A, the film breaking strength of the resin layer 33 as B, the glass transition temperature of the resin layer 33 as $T_g$, the initial bond strength of the heat-sensitive adhesive layer 35 as C, the heat temperature applied to bond the heat-sensitive adhesive layer 35 as $T_h$, and the thickness of the transfer foil 40 as H. Still referring to FIG. 2, film breaking strength B of resin layer 33 is a measure of the longitudinal stress within resin layer 33 which will cause a break in the resin layer as shown by the longitudinal opposing arrows at B. Stated another way, film breaking strength B is the tensile strength of resin layer 33, i.e., the resistance offered by the resin layer to tensile stresses as measured by the tensile force per unit cross-sectional area required to make a break within the resin layer as shown by the longitudinal opposing arrows at B.

In general, the initial bond strength C of the heat-sensitive adhesive layer 35 is small. Under such circumstances, it is necessary in order to transfer a fine region of the transfer foil 40 precisely according to a transfer pattern of the thermal head 37 or the like to satisfy the following condition (1):

$$B<A<<C \quad \ldots (1)$$

Figure 3:
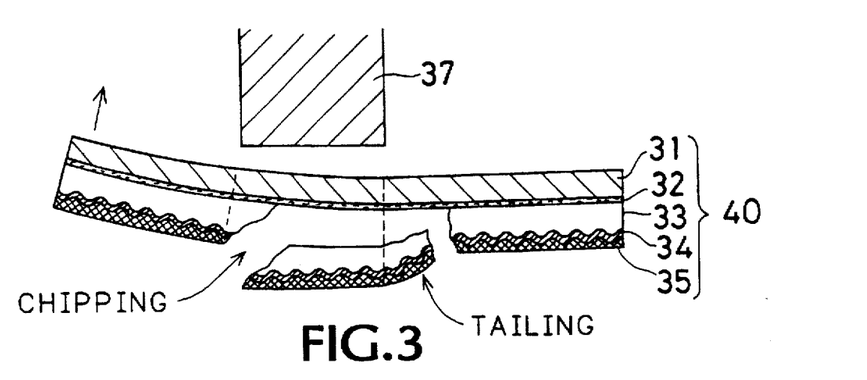
FIG. 3 illustrates conditions of the transfer foil in which the resin layer does not readily break and hence the foil breaking characteristics are inferior, so that chipping and tailing occur, resulting in a failure to transfer a fine region precisely.

In other words, no transfer can be effected unless the peel strength A of the release layer 32 and the film breaking strength B of the resin layer 33 are smaller than the initial bond strength C of the heat-sensitive adhesive layer 35 to a certain extent. If the film breaking strength B of the resin layer 33 is larger than the peel strength A of the release layer 32, the resin layer 33 does not readily break, so that foil breaking characteristics are inferior, resulting in chipping and tailing, as shown in FIG. 3. Thus, no fine region can be transferred precisely. Accordingly, for the heat-sensitive adhesive layer 35, the reflecting layer 22 and the resin layer 33, materials which satisfy the condition (1) must be selected. Specifically, since C is about 10 g/inch or less in general, a material whose A is 1 g/inch to 5 g/inch and a material whose B is 0.5 g/inch to 1.0 g/inch are suitable.

In addition, it is preferable to satisfy the following condition (2):

$$T_g>T_h \quad \ldots (2)$$

More specifically, the heat temperature $T_h$ applied to bond the heat-sensitive adhesive layer 35 is a temperature at which the heat-sensitive adhesive is fusion-bonded, and there is therefore a limitation in lowering of $T_h$. In general, $T_h$ is 100° C. to 150° C. On the other hand, the glass transition temperature $T_g$ of the resin layer 33 is a temperature above which the resin layer 33 exhibits rubber elasticity and below which the resin layer 33 becomes glassy and likely to break. Accordingly, the higher $T_g$ of the resin layer 33, the better the foil breaking characteristics, and the sharper the edges of the transferred pattern. Moreover, if $T_g<T_h$, the resin layer 33 exhibits rubber elasticity at the time of bonding, so that the relief pattern is likely to disappear due to the pressure applied from the thermal head 37 or the like. Accordingly, it is preferable to select a material for the resin layer 33 which satisfies the condition (2).

Figure 4:
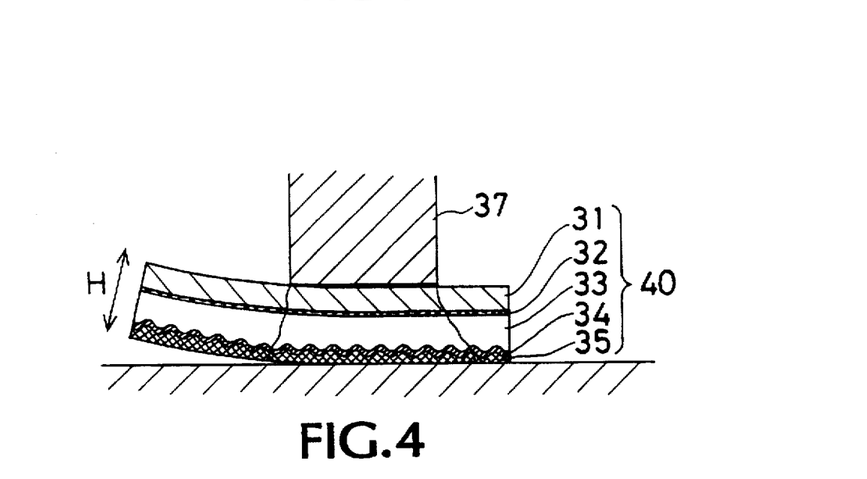
FIG. 4 illustrates the relationship between the thickness of the transfer foil and the heat for transfer.

In addition, since the heat for transfer from the thermal head 37 or the like diffuses and spreads at the heat-sensitive adhesive layer (35) side of the transfer foil 40, as shown in FIG. 4, it is preferable that the thickness H of the transfer foil 40 should be as small as possible and satisfy the following condition (3):

$$H<15 \mu m \quad \ldots (3)$$

It is necessary to satisfy the condition of H<3 µm to 15 µm in order to enable resolution of a transferred pattern of characters of 9 point or smaller.

Figure 5:
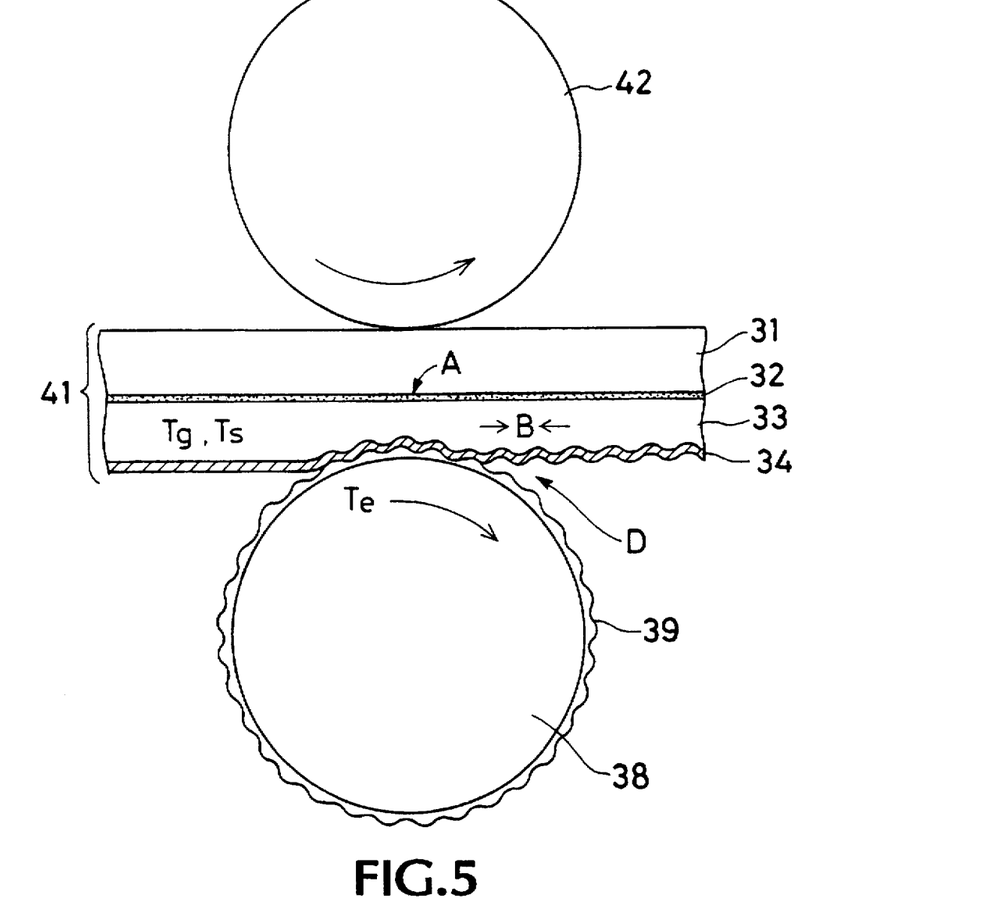
FIG. 5 illustrates the way in which embossing is carried out according to the present invention.

Let us now examine conditions for a method of producing a surface relief pattern transfer foil having the reflecting layer 34 that satisfies the above-described conditions, particularly a reflection relief hologram transfer foil, by press-embossing a surface relief pattern on a substrate through the reflecting layer 34 formed thereon in advance. FIG. 5 illustrates the way in which embossing is carried out in the present invention. Reference numeral 41 denotes an embossing blank sheet comprising a base film 31, a release layer 32, a resin layer 33 and a reflecting layer 34, which are stacked in the mentioned order. A plate cylinder 38 is wound at its periphery with a stamper 39 having a hologram relief pattern. Reference numeral 42 denotes an impression cylinder. With the blank sheet 41 passed between the impression cylinder 42 and the plate cylinder 38, these cylinders are rotated as shown by the arrows under heating and with high pressure applied between the cylinders, thereby enabling the relief surface of the stamper 39 to be periodically embossed on both the reflecting layer 34 and the resin layer 33. It is assumed that the force with which the stamper 39 is released from the blank sheet 41 is D, the softening temperature of the resin layer 33 is $T_s$, and the embossing temperature is $T_e$, as illustrated. It should be noted that the glass transition temperature of the resin layer 33 is $T_g$ as in the above.

In order to enable the relief surface of the stamper 39 to be embossed on both the reflecting layer 34 and the resin layer 33 under these preconditions, it is necessary to satisfy the following condition (4):

$$A > B \gg D \qquad \ldots (4)$$

More specifically, if the release force D is larger than the peel strength A of the release layer 32 and the film breaking strength B of the resin layer 33, the transfer foil will be undesirably transferred to the stamper 39. The relationship between A and B is based on the condition (1). In this regard, if embossing is effected over the reflecting layer 34 of a metal or the like, the release force D is smaller than 1 g/inch. On the other hand, if the stamper 39 is embossed directly on the resin layer 33 that is provided with no reflecting layer 34 as in the prior art, the release force D is larger than 1 g/inch in general. If silicone or the like is added to the resin layer 33 in order to minimize the release force D, the adhesion of the reflecting layer 34, which is formed after the embossing process, lowers undesirably.

With regard to the relationship between the softening temperature $T_s$ and the glass transition temperature $T_g$ of the resin layer 33 and the embossing temperature $T_e$, it is necessary to satisfy the following condition (5):

$$T_g \leq T_s \ll T_e \qquad \ldots (5)$$

In this condition, $T_g \leq T_e$ means that embossing is carried out in the rubber elasticity region of the resin layer 33. If embossing is carried out below the glass transition temperature, the resin layer 33 cracks finely, which is undesirable. As has already been mentioned in connection with the condition (2), the higher $T_g$, the better, and the lower $T_e$, the more readily the embossing process can be executed. It is therefore preferable to carry out embossing at a temperature $T_e$ in the vicinity of $T_g$. The reason for $T_e \ll T_s$ will be clarified by comparison with the prior art in which the stamper 39 is embossed on the resin layer 33 that is provided with no reflecting layer 34 and thereafter the reflecting layer 34 is provided on the embossed surface. In the prior art, $T_e \geq \geq T_s$ because the resin layer 33 is embossed on softening. However, with the prior art process, the embossed relief pattern is deformed due to the heat remaining after the embossing process, so that the holographic effect (diffraction efficiency in the case of a hologram) deteriorates undesirably. In order to avoid such a defect, an extra cooling process must be provided. In addition, since the embossing temperature $T_e$ is high, expansion of the base film 31 and other problems arise. Hence, the thickness of the base film 31 cannot be minimized, so that it is difficult to satisfy the condition (3).

In contrast, if embossing is carried out in a region where the condition of $T_e \ll T_s$ is satisfied, no thermal deformation of the relief pattern as in the prior art occurs. In addition, the surface relief pattern is retained effectively by cooperation of the high-pressure embossing and the pattern retaining effect of the reflecting layer 34, so that cooling is not needed. Since the embossing temperature $T_e$ is relatively low, it is possible to minimize the thickness of the base film 31 and hence the thickness of the transfer foil 40, so that the condition (3) can be satisfied. To effect embossing over the reflecting layer 34 under these conditions, in the case of a roll press, it is necessary to employ a pressure of 10 kg/cm to 200 kg/cm in terms of linear pressure; in the case of a flat press, it is necessary to employ a high embossing pressure of 50 kg/cm$^2$ to 1,000 kg/cm$^2$ and use a hard stamper 39 having a Vickers hardness of the order of Hv 200 to Hv 600.

The following is a description of a material for each of the layers of the transfer foil 40 and an embossing method, which are selected on the basis of the above-described examination. As a material for the base film 31, biaxially oriented polyethylene terephthalate film is most preferable from the viewpoint of dimensional stability, heat resistance, toughness, etc. Other materials usable for the base film 31 are synthetic films such as polyvinyl chloride film, polypropylene film, polyethylene film, polycarbonate film, cellophane, Vinylon (trademark) film, acetate film, nylon film, polyvinyl alcohol film, polyamide film, polyamide-imide film, etc., and paper such as condenser paper. The thickness of the base film 31 is preferably of the order of 6 µm to 12 µm.

The release layer 32 is provided for the purpose of improving release characteristics and foil breaking characteristics. For the release layer 32, various known materials can be used in accordance with the kind of the base film 31, for example, polymethacrylate resin, polyvinyl chloride resin, cellulose resin, silicone resin, wax containing hydrocarbon as a principal component, polystyrene resin, chlorinated rubber, casein, various kinds of surface-active agent, metal oxides, etc. These materials can be used alone or in the form of a mixture of two or more so that the release layer 32 can have a peel strength of 1 g/inch to 5 g/inch (peeling at 90 degrees) in combination with the base film 31.

With these materials, the release layer 32 may be formed as a thin film on the base film 31 by a known method, for example, by coating the material in the form of ink. The thickness of the release layer 32 is preferably in the range of from 0.1 µm to 1.0 µm when the peel strength and foil breaking characteristics are taken into consideration.

It is also possible to form a releasable base film by previously mixing the base film with a release layer material so that the base film is releasable.

For the resin layer 33, various resin materials can be selected with the foil breaking characteristics and transfer heat resistance taken into consideration. Specific examples of the material usable for the resin layer 33 are unsaturated polyester resin, acryl urethane resin, epoxy-modified acrylic resin, epoxy-modified unsaturated polyester resin, acrylic ester resin, acrylamide resin, nitrocellulose resin, polystyrene resin, alkyd resin, phenolic resin, etc. These materials may be used alone or in the form of a mixture of two or more. It is also possible to add to these materials a proper amount of a heat- or ultraviolet-curing agent selected from among isocyanate resins, metallic soaps such as cobalt naphthenate and lead naphthenate, peroxides such as benzoyl peroxide and methyl ethyl ketone peroxide, benzophenone, acetophenone, anthraquinone, naphthoquinone, azobisisobutyronitrile, diphenyl sulfide, etc.

These materials are blended together so that the glass transition temperature $T_g$ can be higher than the heat temperature $T_h$ applied during the heat transfer process. Specifically, it is preferable that the glass transition temperature $T_g$ should be 100° C. to 200° C.

The resin layer 33 can be formed by coating the material in the form of ink according to a known method. When it is considered that the foil breaking characteristics (film breaking strength) should be set in the range of from 0.5 g/inch to 1.0 g/inch, the thickness of the resin layer 33 is preferably in the range of from 0.5 μm to 2.0 μm.

A reflective thin film layer for forming the reflecting layer 34 is provided on the surface of the resin layer 33 by deposition, sputtering, ion plating, electrolytic plating, electroless plating, etc., using a metal, a metallic compound, glass, etc.

In the case of a reflection hologram, a metal thin film that reflects light is employed as the reflective thin film layer 2, whereas in the case of a transparent hologram, a holographic effect thin film is employed which exhibits holographic effect in combination with the resin layer 33 and which does not conceal the underlying layer. Thus, the reflective thin film may be properly selected according to the purpose.

Specific examples of the metal thin film usable for a reflection hologram are metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or in combination of two or more. Among the above-mentioned metals, Al, Cr, Ni, Ag and Au are particularly preferable. The film thickness is preferably 10 Å to 10,000 Å, more preferably 300 Å to 1,000 Å.

The holographic effect thin film that is employed for a transparent hologram may be made of any material as long as it transmits light so that the holographic effect can be exhibited. Examples of such material include a transparent material which is different in refractive index from the resin layer 33, and a reflective metal thin film layer having a thickness not larger than 200 Å. In the case of the former, the refractive index may be either larger or smaller than that of the resin layer 33, but the refractive index difference is preferably 0.1 or more, more preferably 0.5 or more. According to an experiment carried out by the present inventor, a refractive index of 1.0 or more is the most suitable. By providing a transparent thin film layer 34 that is different in refractive index from the resin layer 33, the required holographic effect can be exhibited and, at the same time, the underlying layer can be seen through the layer 34.

In the case of the latter, although it is a reflective metal film layer, since the thickness is not larger than 200 Å, the light wave transmission factor is large, so that the required holographic effect can be exhibited and, at the same time, the underlying layer can be seen through the layer 34. By setting the film thickness at 200 Å or less, the incongruity in the appearance that has heretofore been given by silver gray of high brightness is eliminated.

Examples of the materials usable for the thin film layer 34 includes those described below (1) to (6).

(1) Transparent continuous thin films having a larger refractive index than that of the resin layer 33:

This type of thin film includes those which are transparent in the visible region and those which are transparent in either the infrared or ultraviolet region. As the former, materials shown in Table 1 are usable; as the latter, materials shown in Table 2 are usable. In the tables n denotes the refractive index (the same is the case with the materials (2) to (5)).

TABLE 1

| Materials which are transparent in the visible region | | | |
|---|---|---|---|
| Materials | n | Materials | n |
| $Sb_2S_3$ | 3.0 | SiO | 2.0 |
| $Fe_2O_3$ | 2.7 | $InO_3$ | 2.0 |
| PbO | 2.6 | $Y_2O_3$ | 1.9 |
| ZnSe | 2.6 | TiO | 1.9 |
| CdS | 2.6 | $ThO_2$ | 1.9 |
| $Bi_2O_3$ | 2.4 | $Si_2O_3$ | 1.9 |
| $TiO_2$ | 2.3 | $PbF_2$ | 1.8 |
| $PbCl_2$ | 2.3 | $Cd_2O_3$ | 1.8 |
| $Cr_2O_3$ | 2.3 | MgO | 1.7 |
| $CeO_2$ | 2.2 | $Al_2O_3$ | 1.6 |
| $Ta_2O_5$ | 2.2 | $LaF_3$ | 1.6 |
| ZnS | 2.2 | $CeF_2$ | 1.4 |
| ZnO | 2.1 | $NdF_3$ | 1.6 |
| CdO | 2.1 | $SiO_2$ | 1.5 |
| $Nd_2O_3$ | 2.1 | $SiO_3$ | 1.5 |
| $Sb_2O_3$ | 2.0 | | |

TABLE 2

| Materials which are transparent in either the infrared or the ultraviolet region | |
|---|---|
| Materials | n |
| CdSe | 3.5 |
| CdTe | 2.6 |
| Ge | 4.0–4.4 |
| $HfO_2$ | 2.2 |
| PbTe | 5.6 |
| Si | 3.4 |
| Te | 4.9 |
| TiCl | 2.6 |
| ZnTe | 2.8 |

(2) Transparent ferroelectric materials having a larger refractive index than that of the resin layer 33:

Materials shown in Table 3 are usable.

TABLE 3

| Materials | n |
|---|---|
| CuCl | 2.0 |
| CuBr | 2.2 |
| GaAs | 3.3–3.6 |
| GaP | 3.3–3.5 |
| $N_4(CH_2)_6$ | 1.6 |
| $Bi_4(GeO_4)_3$ | 2.1 |
| $KH_2PO_4$ (KDP) | 1.5 |
| $KD_2PO_4$ | 1.5 |
| $NH_4H_2PO_4$ | 1.5 |
| $KH_2AsO_4$ | 1.6 |
| $RbH_2AsO_4$ | 1.6 |
| $KTa_{0.65}Nb_{0.35}O_3$ | 2.3 |
| $K_{0.6}Li_{0.4}NbO_3$ | 2.3 |
| $KSr_2Nb_5O_{15}$ | 2.3 |
| $Sr_xBa_{1-x}Nb_2O_6$ | 2.3 |
| $Ba_2NaNb_{15}$ | 2.3 |
| $LiNbO_3$ | 2.3 |
| $LiTaO_3$ | 2.2 |
| $BaTiO_3$ | 2.4 |
| $SrTiO_3$ | 2.4 |
| $KTaO_3$ | 2.2 |

(3) Transparent continuous thin films having a smaller refractive index than that of the resin layer 33:

TABLE 4

| Materials | n |
|---|---|
| LiF | 1.4 |
| MgF$_2$ | 1.4 |
| 3NaF.AlF$_3$ | 1.4 |
| AlF$_3$ | 1.4 |
| NaF | 1.3 |
| GaF$_2$ | 1.3 |

(4) Reflective metal thin films having a thickness not larger than 200 Å.

Reflective metal thin films have a complex index of refraction, which is expressed by n=n−ik, where n is the refractive index and k is the absorption coefficient. Materials of reflective metal thin film layers usable in the present invention are shown in Table 5 below, together with n and k.

Materials shown in Table 5 are usable.

TABLE 5

| Materials | n | K |
|---|---|---|
| Be | 2.7 | 0.9 |
| Mg | 0.6 | 6.1 |
| Ca | 0.3 | 8.1 |
| Cr | 3.3 | 1.3 |
| Mn | 2.5 | 1.3 |
| Cu | 0.7 | 2.4 |
| Ag | 0.1 | 3.3 |
| Al | 0.8 | 5.3 |
| Sb | 3.0 | 1.6 |
| Pd | 1.9 | 1.3 |
| Ni | 1.8 | 1.8 |
| Sr | 0.6 | 3.2 |
| Ba | 0.9 | 1.7 |
| La | 1.8 | 1.9 |
| Ce | 1.7 | 1.4 |
| Au | 0.3 | 2.4 |

It is also possible to use other materials such as Sn, In, Te, Fe, Co, Zr, Ge, Pb, Cd, Bi, Se, Ga, Rb, etc. In addition, oxides and nitrides of the above-mentioned metals can be used alone or in combination of two or more.

(5) Resins which are different in refractive index from the resin layer 33:

The refractive indices of these resins may be either larger or smaller than that of the resin layer 33. Exemplary resins are shown in Table 6. It is possible to use ordinary synthetic resins in addition to the above, and it is particularly preferable to use a resin which is largely different in refractive index from the resin layer 33.

TABLE 6

| Resins | n |
|---|---|
| Polytetrafluoroethylene | 1.35 |
| Polycholorotrifluoroethylene | 1.43 |
| Vinyl acetate resin | 1.46 |
| Polyethylene | 1.52 |
| Polypropylene | 1.49 |
| Methyl methacrylate | 1.49 |
| Nylon | 1.53 |
| Polystyrene | 1.60 |
| Polyvinylidene chloride | 1.62 |
| Vinyl butyral resin | 1.48 |
| Vinyl formal resin | 1.50 |
| Polyvinyl chloride | 1.53 |

TABLE 6-continued

| Resins | n |
|---|---|
| Polyester resin | 1.55 |
| Phenol-formalin resin | 1.60 |

(6) Laminates obtained by properly combining the Materials (1) to (5):

The materials (1) to (5) may be combined with each other as desired, and the positional relationship between the layers of a laminate may be determined as desired.

Of the thin film (1) to (6), the thin film layer (4) has a thickness of not larger than 200 Å, whereas the thickness of the thin film layers (1) to (3), (5) and (6) may be determined as desired as long as the material forming the thin film is transparent in the relevant spectral region; in general, the thickness is preferably 10 Å to 10,000 Å, more preferably 100 Å to 5,000 Å.

When the thin film layer 34 is made of any of the materials (1) to (4), the holographic effect layer 34 can be formed on the resin layer 33 by using a conventional thin film forming means, e.g., vacuum deposition, sputtering, reactive sputtering, ion plating, electrolytic plating, etc., whereas, when the thin film layer 34 is made of the material (5), a conventional coating method can be employed. When the thin film 34 is made of the material (6), the above-mentioned means and methods may be properly combined together.

In the present invention, the thickness of the holographic effect layer 34 is preferably 100 Å to 600 Å in general. If the thickness is less than 100 Å, the reflecting effect becomes inadequate, whereas, if the thickness exceeds 600 Å, the embossing characteristics lower considerably.

A stamper for embossing such a transfer foil 40 can be produced by a known method. However, the stamper needs high pressure resistance and satisfactorily high hardness and tensile strength because a surface relief pattern on the surface thereof must be pressed into the mating substrate completely. For this reason, it is most suitable to obtain a stamper by electrolytic Ni plating method. The hardness is preferably in the range of from Hv 200 to Hv 600 in Vickers hardness, and a hardness of Hv 500 to Hv 600 is the most suitable for emboss pressing. If the Vickers hardness is less than Hv 200, the stamper 39 becomes flexible, so that the stamper 39 may be elastically deformed by high pressure applied during the pressing process, resulting in a failure to transfer the relief pattern faithfully. If the hardness exceeds Hv 600, brittleness increases, so that fatigue destruction of the stamper 39 is likely to occur due to the repeated application of shearing pressure during the pressing process, resulting in a lowering in the durability.

The emboss substrate (comprising the base film 31, the release layer 32, the resin layer 33, and the reflecting layer 34) and the stamper 39, which are obtained as described above, are put one on top of the other in such a manner that the reflecting layer 34 of the substrate film and the surface relief of the stamper 39 are brought into contact with each other, and are then heat-pressed, thereby transferring the relief pattern to both the reflecting layer 34 and the resin layer 33, and thus completing a transfer foil 40.

By carrying out this process at a temperature which is in the vicinity of the glass transition temperature of the resin layer 33, preferably at a temperature which is 5° to 20° C. higher than the glass transition temperature, it is possible to realize excellent transfer of the relief pattern. If the temperature is lower than this temperature range, the relief pattern can not be satisfactorily transferred due to the elastic recovery of the resin layer 33. If the temperature is higher than the temperature range, the resin layer 33 is deformed, so that the reflective thin film layer 34 cracks finely, causing whitening and other problems.

To realize satisfactory transfer of the relief pattern, it is preferable to employ a pressure for pressing in the range of from 10 kg/cm to 200 kg/cm in terms of linear pressure in the case of a roll press and a pressure of 50 kg/cm$^2$ to 1,000 kg/cm$^2$ in the case of a flat press.

In addition, it is necessary to employ for the pressing process a hot plate or press roll which has been subjected to high-frequency quenching and precision grinding such that the surface accuracy is within ±1 μm and the hardness is more than Hv 600 in terms of Vickers hardness so that the pressure is uniformly applied to the emboss substrate.

By heat-pressing the emboss stamper 39 and the emboss substrate 41 having the reflecting layer 34 under these press conditions, the following advantages are obtained:

(1) Since the reflecting layer 34 is not thermally deformed, the relief pattern formed on the resin layer 33 is not deformed again by the heat remaining after the pressing process, and a faithful relief pattern can be duplicated.

(2) Since the reflecting layer 34 has a higher heat softening temperature than that of a resin material and is superior in the release characteristics with respect to the stamper 39, there is no possibility of the reflecting layer 34 being transferred to the stamper 39 and there is therefor no need for a cooling process.

(3) Since the reflecting layer 34 need not be provided after the embossing process, there is no thermal deformation of the relief pattern.

(4) Since emboss pressing is effected directly on the reflecting layer 34, the relief pattern is transferred precisely and a uniform film thickness is obtained in comparison to the prior art in which the reflecting layer 34 is provided after the embossing process.

(5) Since the reflecting layer 34 is provided in advance, deposition and other associated processes need not be carried out for each lot, so that the process efficiency is high. In addition, since there is no mixing of dust, a product of high quality is obtained.

The heat-sensitive adhesive layer 35 is formed on the surface of the reflecting layer 34 of the hologram transfer foil obtained in this way by using a material which comprises at least one thermoplastic resin selected form among polyacrylic acid ester resin, polyvinyl chloride resin, chlorinated polypropylene resin, polyester resin, polyurethane resin, rosin or rosin modified maleic resin, and vinyl chloride-acetate resin, and a proper amount of a pigment or a dye added thereto.

EXAMPLE 1

A release layer of wax with a peel strength of 5 g/inch was provided to a thickness of 0.5 μm on the surface of a base film of PET having a thickness of 12 μm, and a resin layer of acryl urethane resin having a thickness of 1.0 μm, a film breaking strength of 1 g/inch, a glass transition temperature of 140° C. and a softening temperature of 160° C. was coated on the release layer. Further, aluminum was evaporated to a thickness of 300 Å on the resin layer to obtain a laminate for duplicate. A relief hologram stamper formed by nickel plating and having a Vickers hardness of Hv 500 was wound around a plate cylinder, and it was heated to 145° C. and pressed against the reflecting layer side of the laminate with a linear pressure of 150 kg/cm, thereby making a duplicate of the relief hologram. The release force in this process was 0.5 g/inch at a speed of 20 m/min. Thereafter, a heat-sensitive adhesive layer of vinyl chloride-acetate resin was coated to a thickness of 1.5 μm on the surface of the laminate formed with the duplicate relief hologram and then dried, thereby producing a reflection relief hologram transfer foil. The overall thickness of the transfer foil was 14 μm. It should be noted that the initial bond strength of the heat-sensitive adhesive layer is 50 g/inch or less in general.

The hologram transfer foil obtained in this way was laid on a PET film (188 μm) coated on the surface thereof with vinyl chloride-acetate resin, and heat transfer was effected at 0.6 mJ/dot by using a thin-film thermal head (8 dots/mm).

The transfer printed section thus obtained was superior in the foil breaking characteristics, adhesion, etc., and all the dots were resolved.

Further, the above-described hologram transfer foil was laid on coat paper (Tokubishi Art: trade name) and hot-stamped at a transfer temperature of 145° C., a press linear pressure of 10 kg/cm and a press time of 0.2 seconds by using each of parallel-line test chart stampers varying in line pitch and width and typographic test charge stampers varying in point size. The finest parallel-line pattern that was capable of being resolved was the one having a pitch of 0.4 mm and a line width of 0.2 mm. In the case of the typography, 8-point types were the smallest ones that were clearly transferred.

Incidentally, there is another requirement for the transfer foil 40 which is provided with a surface relief pattern thereon and includes a reflecting layer as shown in FIG. 1. That is, to achieve transfer of the fine pattern with high resolution using a thermal head as shown in FIG. 1, the thermal head 37 must move relatively and smoothly along the back surface of the substrate film 31 without coming in thermal adhesive contact therewith. It is desired to this end that the substrate film 31 of the transfer foil 40 be provided with a slipping layer 36 on the back surface thereof that contacts the thermal head.

Figure 6:
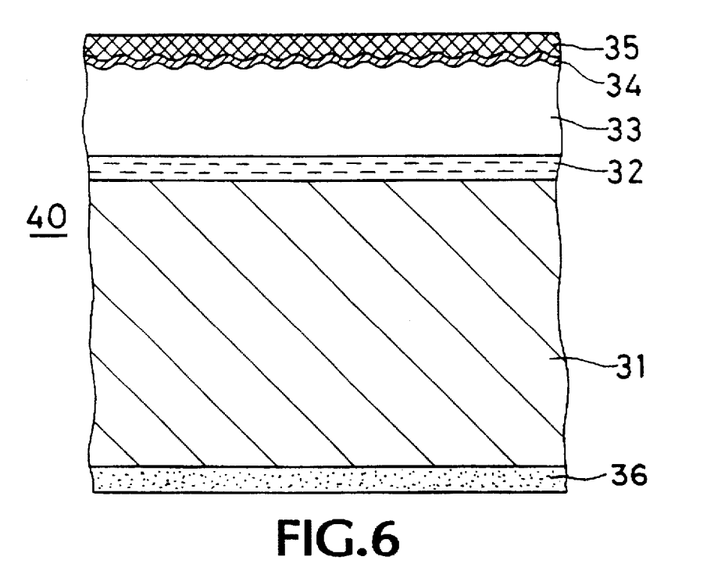
FIG. 6 is a sectional view of the reflection relief hologram according to the present invention, in which a slipping layer is provided on the back surface of the transfer foil that comes in contact with a thermal head.

Some fundamental layer designs are envisaged for this slipping layer 36. The first layer design is a layer that contains microsilica or other inorganic powders as a solid slipping agent. The second is a layer in which there is dissolved or dispersed an organic slipping agent such as wax, silicone oil or phosphoric acid ester that is converted to a liquid phase slipping agent upon being heated. The provision of the slipping layer 36, whether of the first type or of the second type, gives rise to an increase in the heat resistance of the substrate film 31, which in turn makes the thermal head 37 more unlikely to bond thereto. The third is a layer having an extreme surface relief pattern thereon, which is formed on the back surface of the substrate film 31 that comes into contact with the thermal head 37. When such an extreme surface relief pattern is provided on the surface of the substrate film 31 in contact with the thermal head 37, the area of contact of the substrate film 31 with the thermal head 37 is so reduced that the thermal head 37 can slide stably over the substrate film due to a decreased frictional force. The relief surface is also useful for reducing the diffusion of heat in the longitudinal direction of the transfer foil; so making sharp transfer of very small characters, etc., possible. Preferably, the relief pattern has a pitch lying in the range of 0.5 μm to 2.0 μm and a depth lying the range of 0.1 μm to 15 μm. Possible, but not exclusive, relief patterns may be a randomly matted pattern, a parallel-line pattern parallel or vertical to the moving direction of the thermal had 37, or an optically formed relief hologram pattern.

Preferable embodiments of the transfer foil having such a slipping layer 37 will be described with reference to Examples 2–4.

EXAMPLE 2

A slipping agent of the following composition was bar-coated on the back surface of the PET base film of a reflection relief hologram transfer foil prepared as in Example 1 to obtain a coating of 0.7 g/m² as measured upon drying. After being pre-dried by a dryer, this was aged in an oven at 40° C. for 48 hours to form a slipping layer on the back surface of the base film.

| Composition of Coating Solution for Slipping Layer | |
| --- | --- |
| Acrylic polyol resin | 100 |
| Nitrocellulose resin | 30 |
| Tolylene diisocyanate | 30 |
| Microsilica (DeGussa: Aerosil R972) | 30 |
| Methyl ethyl ketone (MEK)/toluene (1:1) | 300 |

The thus obtained transfer foil was put on an ID card of vinyl chloride with the heat-sensitive adhesive layer brought into contact therewith. Heating was then carried out from the slipping layer side at an output of 1 W, a pulse width of 0.3 msec. to 0.45 msec. and a dot density of 3 dots/mm, while a scanning thermal head for a thermal printer was urged against the slipping layer. It was found that the thermal head could slide smoothly for printing and transfer with neither chattering during scanning nor sticking of the transfer foil. Nor were defects or pinholes observed on the transferred portion.

EXAMPLE 3

A slipping agent of the following composition was bar-coated on the back surface of the PET base film of a reflection relief hologram transfer foil prepared as in Example 1 to obtain a coating of 0.7 g/m² as measured upon drying. After pre-dried by a dryer, this was aged in an oven at 40° C. for 48 hours to form a slipping layer on the back surface of the base film.

| Composition of Coating Solution for Slipping Layer | |
| --- | --- |
| Acrylic polyol resin | 100 |
| Nitrocellulose resin | 30 |
| Tolylene diisocyanate | 30 |
| Triphenyl phosphate | 20 |
| Silicone | 5 |
| Polyethylene wax | 3 |
| MEK/toluene (1:1) | 300 |

The thus obtained transfer foil was put on an ID card of vinyl chloride with the heat-sensitive adhesive layer brought into contact therewith. Heating was then carried out from the slipping layer side at an output of 1 W, a pulse width of 0.3 msec. to 0.45 msec. and a dot density of 3 dots/mm, while a scanning thermal head for a thermal printer was urged against the slipping layer. It was found that the thermal head could slide smoothly for printing and transfer with neither chattering during scanning nor sticking of the transfer foil. Nor were defects or pinholes observed on the transferred portion.

EXAMPLE 4

To obtain a slipping layer, an extreme surface relief pattern-forming ultraviolet curing resin of the following composition was bar-coated on one side of a PET base film of 12 μm in thickness to obtain a coating of about 1 μm in thickness. Then, the relief surface of a metallic stamper including a uniform grating form of hologram relief pattern having a pitch of 1.5 μm and a depth of 0.7 μm was superposed on the surface of the coating. Following this, another side of the PET base film was irradiated with about 200 mJ of ultraviolet rays of 365-nm wavelength from a high-pressure mercury lamp to cure the ultraviolet curing resin. Thereafter, the stamper was removed out to form a hologram relief pattern on the surface of the UV-cured resin on the back side of the PET film.

Following Example 1, a 0.5-μm thick wax release layer having a peel strength of 5 g/inch was provided on the surface of the PET base film opposite to the hologram relief surface of the UV-cured resin. Provided on the release layer was a 0.1-μm thick resin layer of acrylic urethane resin having a film breaking strength of 1 g/inch, a glass transition temperature of 140° C. and a softening temperature of 160° C. Aluminum of 300 Å in thickness was then evaporated on this resin layer to obtain a laminate for duplication. A relief hologram stamper prepared by nickel plating and having a Vickers hardness of Hv 500 was wound around a plate cylinder, and heated and pressed against the reflecting layer side of the laminate at a linear pressure of 150 kg/cm², thereby obtaining a duplicate of the relief hologram. The release force was then 0.5 g/inch at a speed of 20 m/min. A heat-sensitive adhesive layer of vinyl chloride-acetate resin was coated at a thickness of 1.5 μm on the duplicated relief hologram surface and dried to obtain a finished form of reflection relief hologram transfer foil in which a uniform grating form of hologram relief pattern was formed on the back surface of the PET base film to contact a thermal head as the slipping layer.

| Composition of UV-Curing Resin | |
| --- | --- |
| Acrylated epoxy oligomer | 40 parts |
| HDODA (1,6-hexanedioldiacrylate) | 6 parts |
| Photoinitiator (MERK: Darocure 1173) | 4 parts |
| Silicone (DOW: SH-193) | 0.5 parts |

The thus obtained transfer foil was put on the surface of a name-bearing ID card of paper with the heat-sensitive layer brought into contact therewith. Heating was then carried out at an output of 1 W, a pulse width of 0.3 msec. to 0.45 msec. and a dot density of 3 dots/mm, while a scanning thermal head for a thermal printer was urged against the UV-cured resin layer with the hologram relief pattern formed on the surface. It was found that the thermal head could slide smoothly for printing and transfer with neither chattering during scanning nor sticking of the transfer foil. Nor were defects or pinholes observed on the transferred portion.

As has been described above, according to the surface relief pattern transfer foil having a reflecting layer of the present invention, the peel strength between the releasable base film and the resin layer is 1 g/inch to 5 g/inch and set to be larger than the film breaking strength of the resin layer. Therefore, a surface relief pattern can be thermally transferred precisely even with weak adhesive force, with excellent foil breaking characteristics and without chipping or tailing. According to the method of producing a surface relief pattern transfer foil having a reflecting layer of the present invention, a laminate comprising a releasable base film, a resin layer, and a reflecting layer, which are stacked in the mentioned order, is prepared, and a relief surface of a stamper having a surface relief pattern recorded thereon is embossed on the reflecting layer side of the laminate at high temperature and high pressure, thereby transferring the surface relief pattern to both the reflecting layer and the resin layer. Accordingly, the surface relief pattern can be duplicated faithfully without being deformed again and without the need for a deposition process, a cooling process, etc. In addition, it is possible to readily produce a transfer foil which enables a surface relief pattern to be thermally transferred precisely with excellent release characteristics and superior foil breaking characteristics.

What is claimed is:

1. A transfer foil comprising a releasable base film, a resin layer, a reflecting layer, and a heat-sensitive adhesive layer which are stacked in the mentioned order, and having a surface relief pattern formed on the resin layer on the side thereof where the reflecting layer is provided, said transfer foil being partially heated by a thermal head from the said releasable base film so that said surface relief pattern enables transfer of a precise region, wherein:

the peel strength (A) between said releasable base film and said resin layer is larger than the film breaking strength (B) of said resin layer, and the initial bond strength of said heat-sensitive adhesive layer is larger than said peel strength (A).

2. A transfer foil as claimed in claim 1, wherein said film breaking strength (B) is between 0.5 g/inch and 1.0 g/inch.

3. A transfer foil as claimed in claim 1, wherein said peel strength (A) is between 1.0 g/inch and 5.0 g/inch.

4. A transfer foil as claimed in claim 1, which has a thickness of 5 µm to 15 µm.

5. A transfer foil as claimed in claim 1, wherein the glass transition temperature ($T_g$) of said resin layer is higher than the temperature ($T_h$) applied to bond said heat-sensitive adhesive layer and is between 100° C. and 150° C.

6. A transfer foil as claimed in claim 1, wherein said film breaking strength (B) is much larger than the release force (D) during relief pattern formation.

7. A transfer foil as claimed in claim 1, wherein a release layer material has been incorporated in said releasable base film to impart release characteristics thereto.

8. A transfer foil as claimed in claim 1, which has a transparent reflecting layer.

9. A transfer foil as claimed in claim 1, which has a metallic reflecting layer.

10. A transfer foil as claimed in claim 1, wherein a slipping layer is provided on the surface of the releasable base film of said transfer foil that comes into contact with a thermal head.

11. A transfer foil as claimed in claim 10, wherein said slipping layer is formed of a layer containing inorganic powders as a solid slipping agent.

12. A transfer foil as claimed in claim 10, wherein said slipping layer is formed of a layer in which there is dissolved or dispersed an organic slipping agent that is converted into a liquid phase slipping agent upon being heated.

13. A transfer foil as claimed in claim 10, wherein said slipping layer is formed of an extreme surface relief pattern provided on the surface of said releasable base film that comes into contact with a thermal head.

14. A transfer foil as claimed in claim 13, wherein said relief pattern has a pitch lying in the range of 0.5 µm to 2.0 µm and a depth lying in the range of 0.1 µm to 15 µm.

15. A transfer foil as claimed in claim 13, wherein said relief pattern is a randomly matted pattern.

16. A transfer foil as claimed in claim 13, wherein said relief pattern is a parallel-line pattern parallel or vertical to the moving direction of a thermal head.

17. A transfer foil as claimed in claim 13, wherein said relief pattern is a relief hologram pattern.

* * * * *